UNITED STATES PATENT OFFICE.

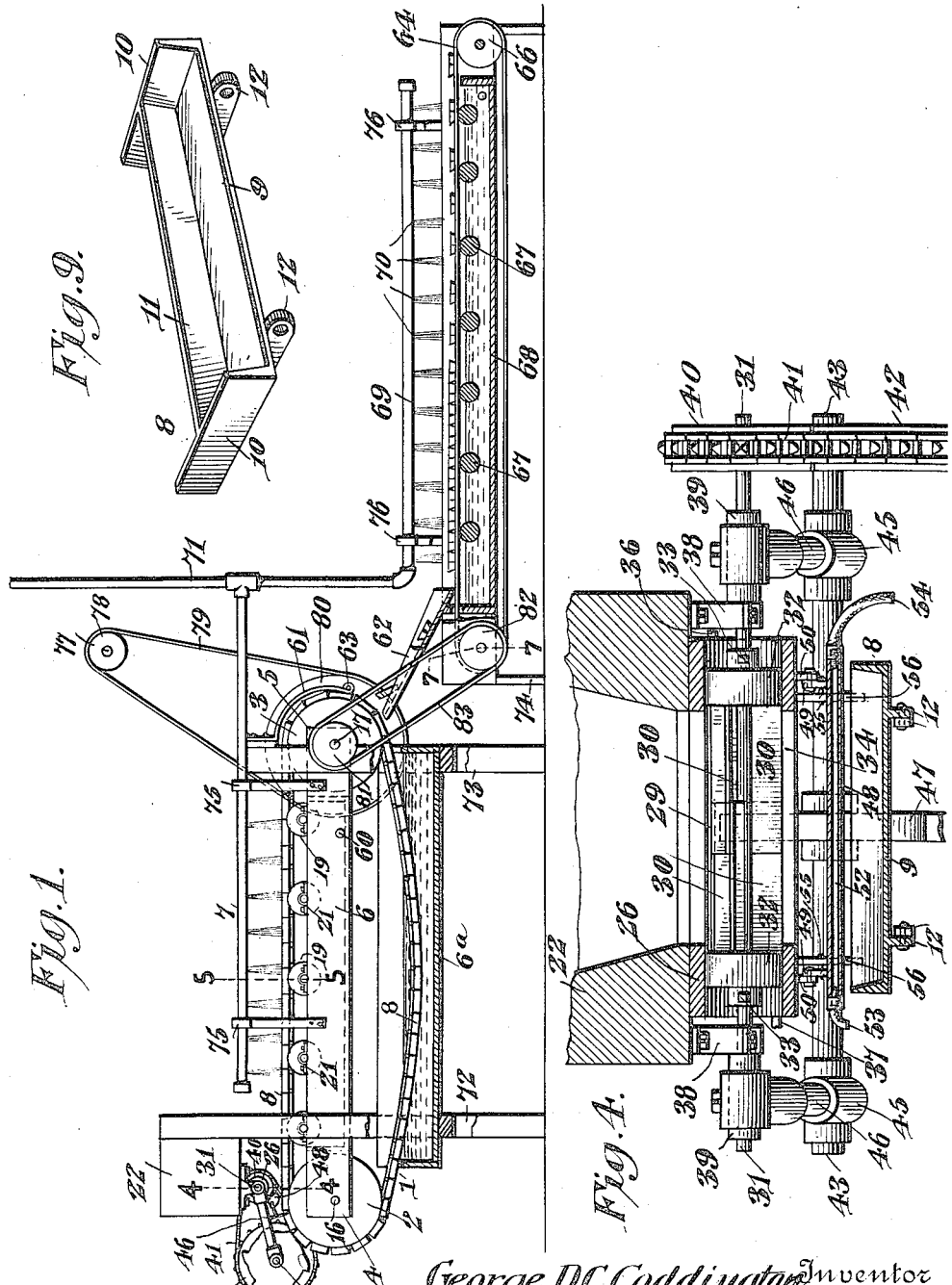
G. D. C. CODDINGTON.
MACHINE FOR MOLDING SEALING WAX.
APPLICATION FILED MAR. 31, 1908.
993,321.
Patented May 23, 1911.
3 SHEETS—SHEET 1.

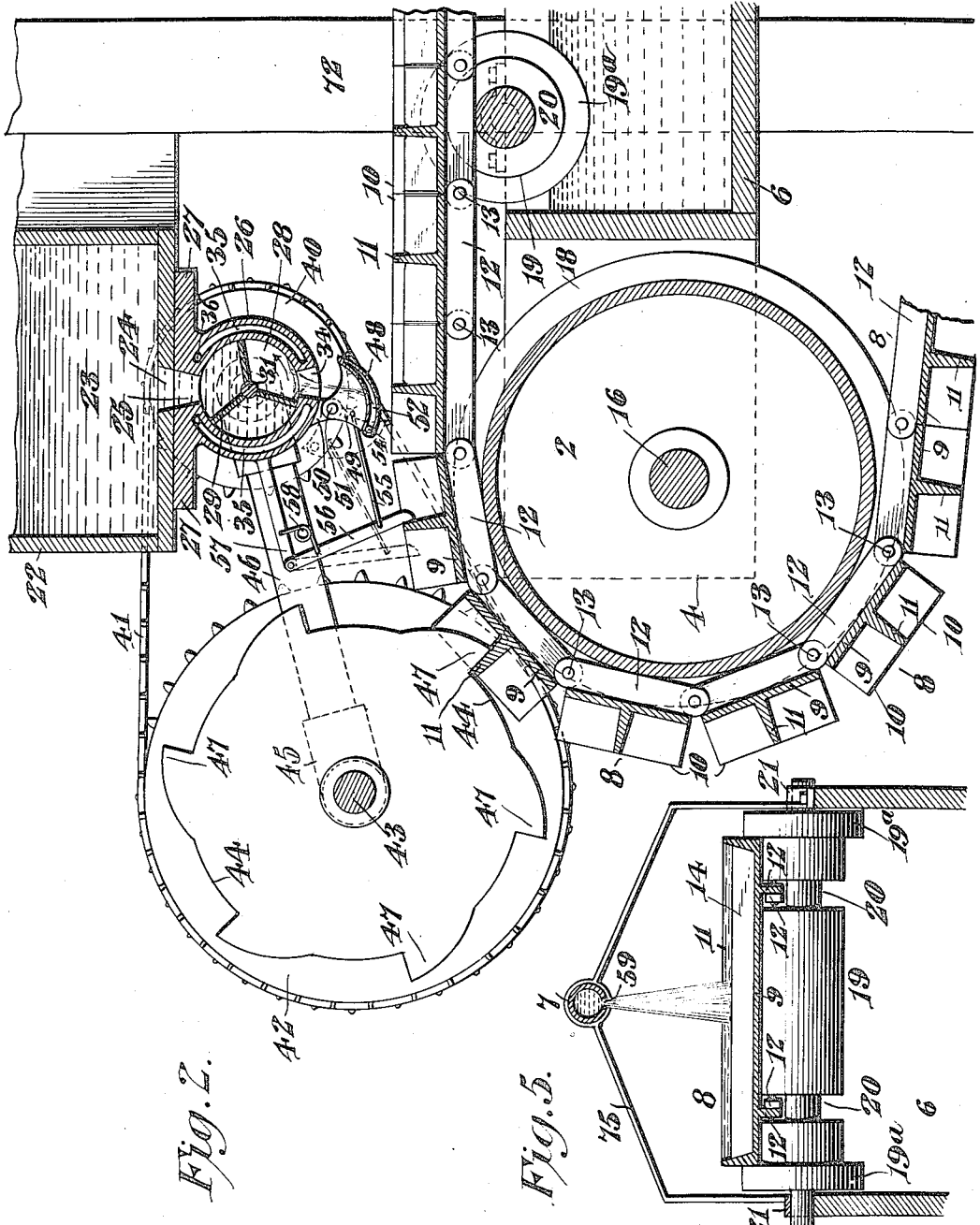

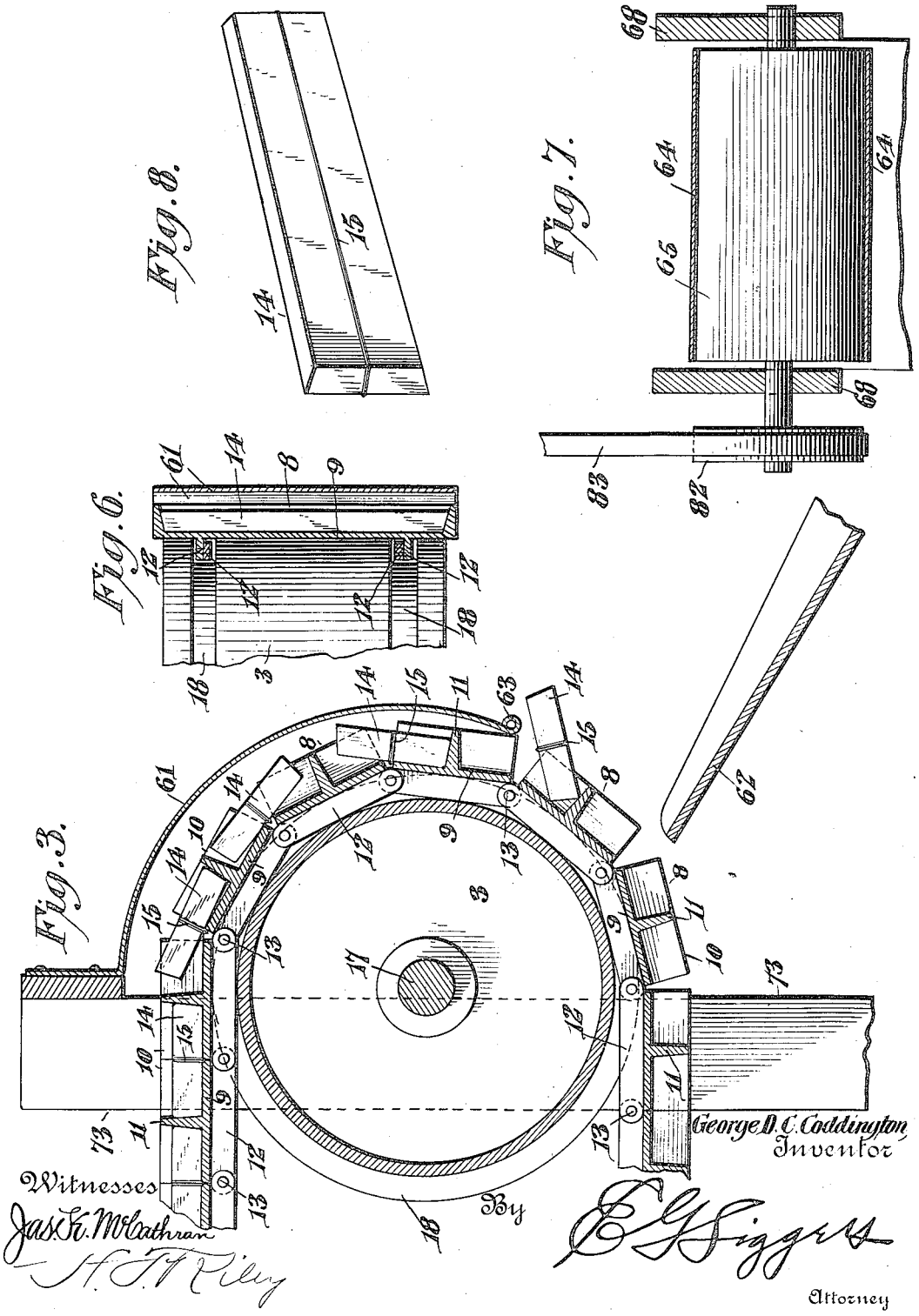

GEORGE DAVID CULLUM CODDINGTON, OF WEST MIDDLETOWN, OHIO.

MACHINE FOR MOLDING SEALING-WAX.

993,321.  Specification of Letters Patent.  Patented May 23, 1911.

Application filed March 31, 1908. Serial No. 424,364.

*To all whom it may concern:*

Be it known that I, GEORGE D. C. CODDINGTON, a citizen of the United States, residing at West Middletown, in the county of Butler and State of Ohio, have invented a new and useful Machine for Molding Sealing-Wax, of which the following is a specification.

The invention relates to a machine for molding sealing wax.

Heretofore sealing wax has been molded into blocks, sticks, cakes or bars by hand, and it has been the practice to pour the sealing wax from a ladle, or other device into individual molds placed in rows on long tables, or other supports. The wax is allowed to stand for an hour or more until the sealing wax becomes cold and sets hard, and when the cakes, sticks or bars have become cooled, they are knocked out of the mold, being often broken and spoiled as they frequently adhere to the walls and bottoms of the molds and have to be broken or melted out. This method of molding sealing wax is slow and laborious, and the largest average of a factory, employing five hands working ten hours a day, is about one thousand pounds a day.

Attempts have been made to mold sealing wax by machinery, but such attempts up to the present invention have proven failures owing to the nature of the sealing wax, which, when melted, will not pour or drop clean or clear from the sides and edges of the receptacle, containing the sealing wax, but will adhere very badly to such parts, and stringing out into long threads, shreds and drops, will, if not prevented, smear across the dividing partitions from one mold to another, making rough ragged edged unmarketable cakes, and binding the several cakes so firmly into the molds as to prevent the cakes from freeing themselves at the points where they should be discharged.

The object of the present invention is to enable sealing wax to be automatically molded into cakes, sticks and bars by machinery instead of by hand as heretofore, and to permit the sealing wax to be rapidly molded into sticks, cakes or bars of the desired form and weight in a smooth and perfectly marketable condition, and thereby greatly increase the out-put of a factory, and at the same time lessen the number of hands required.

Another object of the invention is to provide an automatic sealing wax molding machine, adapted to deliver the proper amount of sealing wax to each mold, and capable of enabling the molded sealing wax to be rapidly handled and quickly cooled without danger of breaking or otherwise injuring the cakes, blocks, sticks or bars.

The invention also has for its object to provide means adapted to positively cut off the flow of sealing wax to the molds, and capable of receiving the drip from the charge for one mold, and of maintaining the same in a liquid condition, and of delivering such drip into the succeeding mold, before the same arrives in position to receive the sealing wax from the measuring and delivering mechanism, whereby a full charge of sealing wax is insured to each mold.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a sealing wax molding machine, constructed in accordance with this invention. Fig. 2 is an enlarged sectional view of the front end of the machine. Fig. 3 is a similar view, illustrating the rear portion of the endless chain of molds and the manner of discharging the cakes of sealing wax therefrom. Fig. 4 is a transverse sectional view on the line 4—4 of Fig. 1. Fig. 5 is a similar view on the line 5—5 of Fig. 1. Fig. 6 is a detail sectional view, illustrating the construction of the end rolls for the endless chain of molds. Fig. 7 is a transverse sectional view on the line 7—7 of Fig. 1. Fig. 8 is a detail perspective view of one of the cakes of sealing wax. Fig. 9 is a detail perspective view of one of the sections or units of the endless chain of molds.

Like numerals of reference designate corresponding parts in all the figures of the drawings.

The machine includes an endless chain of molds 1, composed of upper and lower horizontal flights or stretches and arranged on front and rear rolls 2 and 3. The front and rear rolls 2 and 3, which are disposed transversely of the endless chain of molds, are journaled in suitable bearings of extensions 4 and 5 of the sides of a tank 6, which is located beneath the upper flight or stretch of the endless chain of molds to catch the water of a sprayer 7. The sprayer 7 is located above the upper flight or stretch of the endless chain of molds, and is adapted to moisten the molded cakes of sealing wax for chilling the surface of the molded cakes and to maintain the molds in a cold wet condition for preventing the sealing wax from adhering to them.

The molds, which are preferably oblong, may be of any preferred configuration, and the endless chain of molds is made up of sections or units 8, composed of a bottom 9, end walls 10 and a partition or division wall 11, arranged centrally of the unit or section, as clearly illustrated in Figs. 2 and 3 of the drawings. The molds extend transversely of the endless chain of molds and are divided longitudinally at their median lines, and the units or sections are provided at opposite sides of the endless chain of molds with links 12, preferably formed integral with the units or sections and pivotally connected at their terminals to the ends of the links of the adjacent units or sections by pins 13, or other suitable fastening devices. The end walls 10 and the partition or division wall 11 have inclined or angularly disposed inner faces, forming a flaring mold to facilitate the discharge of cakes 14 of sealing wax from them. The sections of the molds in practice have slight intervening cracks, which, while not being of sufficient size to permit any leakage of wax, form a longitudinal rib or fin 15, which is distinctive of the cake molded by the machine.

The end rolls 2 and 3, which are mounted on suitable transverse shafts 16 and 17, are provided with annular grooves 18 spaced from the ends of the rolls and receiving the links of the endless chain of molds, whereby the molds are held against movement laterally of the machine and are permitted to rest upon the rolls. The upper horizontal flight or stretch of the endless chain of molds sustain the molded cakes and is supported at intervals by intermediate transverse rolls 19, fitting against the bottoms of the units and provided with grooves 20 to receive the links 12 and to permit the bottoms of the molds to rest upon the rolls. The intermediate rolls, which are also provided with end flanges 19ª to fit against the ends of the molds, have terminal journals or gudgeons, which are arranged in suitable bearings 21, mounted upon the upper edges of the sides of the tank 6. These intermediate rolls support the upper horizontal flight of the endless chain of molds and prevent the same from sagging between the large end rolls 2 and 3.

The sealing wax is delivered to the endless chain of molds from a superimposed tank 22, in which the sealing wax 23 is maintained in a molten or liquid condition by any suitable heating means (not shown), and which is provided at the bottom with a discharge opening 24, communicating with a top inlet opening 25 of the casing 26 of a measuring and delivering device. The openings 24 and 25 are tapered and registered, as clearly illustrated in Figs. 2 and 4 of the accompanying drawings, and the casing 26, which is preferably cylindrical, is provided at the top with laterally extending attaching portions 27, suitably secured to the bottom of the tank. The casing 26 is provided with a cylindrical chamber or compartment 28, in which operates a rotary valve 29, having three radially arranged blades or wings for dividing the compartment or chamber 28 of the casing 26 into three equal divisions, but the number of blades or wings may be varied to correspond to the size of the molds employed, as will be readily understood. The rotary valve is composed of two separate sections, and the inner portions 30 of the blades or wings are overlapped and are slidable on each other and on a transverse shaft 31 to which the ends or heads 32 of the valve are secured by set screws 33. The sections of the rotary valve are movable inwardly and outwardly on the transverse shaft 30 to vary the size of the charge or quantity of sealing wax delivered to each of the molds. By this means the thickness of the cakes of sealing wax and their weight may be varied, as desired. The ends or heads 32 of the rotary valve are of sufficient size to partially cover or close the top inlet opening of the valve casing, when the sections of the valve are moved inwardly from the position, illustrated in Fig. 4 of the drawings.

The casing of the measuring and delivering device is provided at the bottom with an outlet opening 34, and it has hollow walls, forming steam-receiving chambers 35 and providing a steam jacket for maintaining the sealing wax within the casing in a liquid condition. The steam is supplied to and discharged from the chambers 35 by means of pipes 36 and 37. Any other suitable means, however, may be employed for maintaining the casing and its contents in a heated condition.

The valve 29 is rotated in the direction of the arrow in Fig. 2 of the drawings, and while one valve compartment is discharging, another is being filled and the third is filled and is moving downward toward the discharge opening. The shaft 31 is journaled in suitable bearings of hangers 38, having tubular bearing portions 39 and secured to and depending from the bottom of the tank at the ends of the casing of the measuring and pouring device. One end of the shaft 31 carries a sprocket pinion 40, which is connected by a sprocket chain 41 with a sprocket wheel 42, mounted on a transverse shaft 43 to which a mold actuated wheel 44 is secured. The shaft 43 is journaled in suitable bearings 45 of arms 46, extending from and secured to the tubular bearing portions 39 of the hangers 38. The tubular arms are preferably constructed of pipes and couplings, as shown, but they may be made of any other suitable material, as will be readily understood. The transverse shaft 43 is located above the front transverse roll 2, and the wheel 44 is provided with an annular series of teeth 47, beveled at their front faces and provided with rear shoulders, arranged to be engaged by the transverse divisions or partitions of the molds, whereby motion is communicated from the endless chain of molds to the measuring and pouring device. The measuring and pouring device is so timed that the valve makes one complete revolution during the passage of three of the molds beneath the bottom outlet opening 34, and the valve deposits the sealing wax in the molds at the center thereof. The teeth 47 of the wheel 44 are spaced apart a distance equal to the space between the partitions 11 of the molds, when the same are disposed around the end roll 2, and the gearing for communicating motion to the rotary valve is positively operated at the same speed as the endless chain of molds.

In order to enable the drip of the measuring and pouring device to be positively cut off from the molds, so that said drip will not drop upon and disfigure the cakes or bars, or fall upon the partitions and interfere with the removal of the cakes from the molds, an oscillatory tray or shield 48 is pivoted to the casing 26 at the bottom thereof, and is arranged to swing inward and outward to and from a point beneath the bottom outlet opening 34. The tray or shield, which forms a cut-off for the drip, is composed of a curved bottom or body portion and tapering side walls 49, pivoted at their upper ends to depending ears 50 by means of pins, or other suitable fastening devices 51. The bottom or body portion is hollow to provide a steam-receiving chamber or compartment 52, and steam is admitted to and escapes from the chamber 52 by means of pipes 53 and 54, constructed of flexible tubing so as not to interfere with the oscillatory movement of the tray or guide. The pipe 54 serves to carry off any water of condensation and operates to drain the receptacle or compartment. After the machine has been in operation a short while comparatively little heat will be required to maintain the cut-off or tray at a sufficiently high temperature to prevent the drip from hardening on it, as the heat of the sealing wax will largely effect this result. The oscillatory shield or tray is connected by a link 55 with a lever 56, pivoted at its upper end to a supporting arm 57 and depending from the same.

The supporting arm 57 extends forwardly from the front side of the casing 26, and the lever 56 extends downwardly into the path of the partitions or division walls of the molds, and is arranged to be actuated by the same to move the shield or tray inwardly to a point beneath the outlet opening 34 of the casing. When the lower portion of the oscillatory lever 56 is engaged by a mold, the guard or tray is moved inwardly at the same speed as the endless chain of molds, and it occupies a position above the division wall of the partition at the back of the mold receiving the material from the measuring and pouring device, and the inner portion of the tray or shield extends beneath the outlet opening 34 in advance of the partition over which the tray or shield is arranged. As soon as the tray or shield moves into the path of the material, it cuts off the drip from the mold and enables a smooth cake or bar to be obtained. The drip received by the tray or shield is maintained in a liquid condition by the heat of the tray or shield, and as soon as the partition, over which the shield is arranged, moves beyond the path of the drip, the next succeeding partition, which actuates the lever 56, disengages itself therefrom, and the tray or shield and the lever 56 are swung outwardly with a quick movement through the action of a spring 58. This uncovers the bottom outlet opening 34, and a charge of sealing wax is then deposited into the mold lying beneath the outlet opening 34 at the center of the said mold, the rotation of the valve being timed so that the discharge does not take place until the guard or shield is moved outward beyond the plane of the opening 34. The outward movement of the tray or shield tilts the same, and the drip contained therein, is deposited in the next succeeding mold at the center thereof. By this operation each mold receives a charge of material from the measuring and pouring device and the drip contained in the tray or shield, and cakes or bars of full weight are thereby insured. It has been found by experience in the operation of the machine after the first few cakes, which may be a trifle light in weight, the succeeding cakes will be of full weight. The shield or tray by being located above the partition of the mold receiving the sealing wax prevents the drip from dragging or stringing over the said partition and connecting the cakes or bars, and thereby interfering with the free discharge of the same from the molds. The spring 58, which swings the lever outwardly, is preferably composed of a coil and opposite arms connected, respectively, to the lever and to the arm 57, but any other form or arrangement of the spring may be employed.

The sprayer consists of a pipe extending longitudinally of the upper flight or stretch of the endless chain of molds, and provided at intervals with jet openings 59, from which water is sprayed upon the sealing wax contained in the molds. The water operates to harden the surfaces of the cakes or bars of sealing wax, and it also maintains the molds in a wet cold condition to prevent the sealing wax from adhering to them, whereby the cakes or sticks are more easily discharged from the molds. The tank 6 is arranged to catch the waste water, and it is provided with a drain opening 60, designed in practice to receive a spigot, or other suitable means for drawing off the water. In order to secure a thorough moistening of the endless chain of molds, the machine is equipped with a lower tank 6$^a$, located beneath and spaced from the upper tank 6 and arranged to receive the lower flight or stretch of the endless chain of molds. In practice the lower flight or stretch of the endless chain of molds will sag into the tank or receptacle 6$^a$, and the molds in passing through the water contained in the lower tank will be chilled and thoroughly wet and in proper condition to receive the sealing wax. Any suitable means may be employed for supplying the lower tank with water at the proper temperature to chill the endless chain of molds. The water serves to harden the exterior of the cakes or bars of sealing wax, while the interior of the blocks or cakes is in a heated condition, which renders the blocks or cakes more or less yieldable and enables them to be handled with great rapidity without danger of breaking.

The division of the molds into sections occurs at the joints or pivotal points of the links and at the centers of the molds, and when the latter arrives at the rear end roll 3, they, in passing around the roll, are opened by reason of the units of the chain of molds being arranged at an angle to each other incident to the curvature of the end roll 3. This automatically loosens the cake or stick of sealing wax, positively freeing it from one section of the mold, as the two sections constituting the mold are disposed at an angle to each other.

The blocks or cakes are retained in the molds by a resilient guard 61 until the blocks or cakes arrive within a short distance of an inclined chute 62, on to which the blocks or cakes fall and down which they slide. The guard 61, which is constructed of spring metal, or other suitable material, is secured at its upper end to the frame-work, which supports the tank 6, and its lower end, which is rolled to provide a bead 63, is arranged to bear against the cakes or sticks to assist in loosening the same should they adhere to one of the sections of the molds. The free lower end of the guard yieldably bears against the cakes or sticks and frees them from the molds without injury. Also owing to the semi-hardened condition of the cakes or sticks of sealing wax, they may be delivered upon the inclined chute without danger of breaking or otherwise injuring them.

The molded cakes or strips slide down the inclined chute, and are deposited on the upper flight of a horizontal conveyer 64, consisting of an endless belt arranged upon end rolls 65 and 66. The upper flight of the conveyer is supported by intermediate transverse rolls 67, journaled in suitable bearings of the sides of a tank or trough 68, which is arranged to catch the water from a sprayer 69. The sprayer 69, which is located above the conveyer 64, consists of a horizontal pipe provided at intervals with jet openings 70 and connected with a water supply pipe 71, with which the sprayer 69 is also connected, as clearly illustrated in Fig. 1 of the drawings. The second sprayer 70 operates to thoroughly chill, set and harden the molded cakes or sticks, which, when removed from the conveyer, are adapted to be wrapped, packed and shipped in the ordinary manner. Instead of providing a second sprayer, the conveyer may be arranged to submerge the cakes or strips of sealing wax in a tank, or other receptacle containing water for cooling and hardening the sealing wax.

The front tank 6 is supported by suitable front and rear legs 72 and 73, the front legs being extended to provide a support for the tank or receptacle 22 containing the sealing wax. The rear tank is also provided with supporting legs 74, but any other suitable frame-work may be employed for mounting the parts of the machine. The front tank is located between the upper and lower flights of the endless chain of molds, and the rear tank is arranged between the upper and lower flights of the conveyer, which is located in a plane below that of the molds. The front and rear sprayers 7 and 69 are supported by spaced arches 75 and 76, secured to the opposite sides of the tanks 6 and 68 and provided at the top with eyes or openings through which the sprayer pipes pass.

Motion is communicated to the machine from an overhead line shaft 77 by means of a pulley 78 and a belt 79, extending from the pulley 78 to a large pulley 80, connected with the rear roll of the endless chain of molds. The large pulley 80 is located at one side of the machine, and motion is communicated from the rear roll of the endless chain of molds to the conveyer by means of pulleys 81 and 82 and a belt 83, located at the other side of the machine, the pulleys being respectively connected with the rear roll of the endless chain of molds and the front roll of the endless conveyer.

The machine is entirely automatic, and it has been found by actual experience, with a machine constructed substantially the same as herein shown and described, that it is possible to produce, with five hands working ten hours, six thousand eight hundred pounds of sealing wax, which is slightly in excess of a week's out-put of a factory, using the ordinary hand molds and employing the same number of hands. So far as I am aware, I am the first to successfully mold sealing wax into cakes, sticks or analogous forms automatically by machinery.

Having thus fully described my invention, what I claim as new and desire to secure by Letters Patent, is:—

1. A machine for molding sealing wax including a receptacle for the melted sealing wax, a measuring device connected with the receptacle, a plurality of molds arranged to successively receive the sealing wax from the measuring device, and means operating between the receptacle and the molds for cutting off the drip from one mold and for depositing the drip in the next mold.

2. A machine for molding sealing wax including a receptacle for the melted sealing wax, a plurality of molds arranged to successively receive the sealing wax from the receptacle, means operating between the receptacle and the molds for cutting off the drip from one mold and for delivering it to the next mold, and means carried by the said means for preventing the drip from hardening.

3. A machine for molding sealing wax including a receptacle for the melted sealing wax, a measuring device communicating with the receptacle, a plurality of molds arranged to successively receive the sealing wax from the measuring device, and a cut-off suspended from the measuring device and movable into and out of the path of the sealing wax and arranged to receive the drip from one mold and inverted during one of its movements for depositing the drip into the next mold.

4. A machine for molding sealing wax including a receptacle for the melted sealing wax, a measuring device communicating with the receptacle, a plurality of molds arranged to successively receive the sealing wax from the measuring device, and a cut-off arranged in the path of and engaged by the molds to carry it to a position beneath the measuring device to receive the drip, said cut-off being movable from such position to deposit the drip into the next mold.

5. A machine for molding sealing wax including a receptacle for the melted sealing wax, a plurality of molds arranged to successively receive sealing wax from the receptacle, and a cut-off movable into and out of the path of the sealing wax and forming a guard or shield for the molds and having means for heating it to prevent the sealing wax from hardening.

6. A machine for molding sealing wax including a receptacle for the melted sealing wax, a plurality of molds arranged to successively receive sealing wax from the receptacle, and a cut-off movable into and out of the path of the sealing wax to cut off the drip and forming a shield for the molds, said cut-off being provided with an interior chamber or compartment arranged to receive heating means to prevent the drip from hardening.

7. A machine for molding sealing wax including a receptacle for the melted sealing wax, a plurality of molds arranged to successively receive sealing wax from the receptacle, a cut-off movable into and out of the path of the sealing wax to cut off the drip and forming a shield for the molds, said cut-off being provided with an interior chamber or compartment and having inlet and outlet openings, and flexible steam pipes connected with the said openings for the supply of steam and for the drainage of the chamber or compartment.

8. A machine for molding sealing wax including a plurality of movable molds, means for pouring sealing wax into the molds, a cut-off movable into and out of the path of the sealing wax to cut off the drip and form a shield for the molds, means operated by the movement of the molds for actuating the cut-off in one direction, and a spring for moving the cut-off in the opposite direction.

9. A machine for molding sealing wax including a plurality of movable molds, means for pouring sealing wax into the molds, a cut-off movable into and out of the path of the sealing wax to cut off the drip and form a shield for the molds, means operated by the movement of the molds for imparting a relatively slow inward movement to the cut-off, and a spring for imparting a quick outward movement to the cut-off.

10. A machine for molding sealing wax including an endless chain of molds, means for pouring sealing wax into the same, a cut-off movable into and out of the path of the sealing wax to cut off the drip and shield the molds therefrom, a movable member connected with the cut-off and arranged in the path of and adapted to be actuated at intervals by the molds for moving the cut-off in one direction, and a spring connected with the said member for moving the cut-off in the opposite direction.

11. A machine for molding sealing wax including an endless chain of molds, means for pouring sealing wax into the molds, a pivoted oscillatory cut-off or tray movable into and out of the path of the sealing wax to cut off the drip and protect the molds, an oscillatory lever connected with the cut-off or tray and arranged in the path of and adapted to be actuated by the molds, and automatically operable means for moving the cut-off or tray in the opposite direction.

12. A machine for molding sealing wax including a sealing wax receptacle provided with a bottom having an outlet located at an intermediate point between its sides, a plurality of molds, a measuring and pouring device located entirely below the bottom of the receptacle and having an inlet communicating with the outlet of the receptacle, said device being arranged to deliver the sealing wax to the molds, and heating means located interiorly of the measuring and pouring device for maintaining the sealing wax in a liquid condition within the said device.

13. A machine for molding sealing wax including a receptacle for the melted sealing wax provided with an outlet opening, a measuring and pouring device comprising a rigid casing having inlet and outlet openings and communicating with the receptacle, a rotary valve provided with an adjustable head movable inwardly and outwardly in the casing to vary the capacity of the valve, and means for fixing the head in its adjustment.

14. A machine for molding sealing wax including a receptacle for the melted sealing wax provided with an outlet opening, a measuring and pouring device comprising a casing having inlet and outlet openings and communicating with the receptacle, and a rotary valve composed of overlapping sections and having means for reducing the capacity of the valve for varying the amount of sealing wax delivered to the molds.

15. A machine for molding sealing wax including a receptacle for the melted sealing wax provided with an outlet opening, a measuring and pouring device comprising a casing having inlet and outlet openings and communicating with the receptacle, and a rotary valve composed of sections having radial overlapping blades and provided with heads movable inwardly and outwardly in the casing to vary the capacity of the valve.

16. A machine for molding sealing wax including a receptacle having a discharge opening, a measuring and pouring device comprising a casing having inlet and outlet openings and communicating with the receptacle, a valve operating within the casing for controlling the amount of sealing wax discharged therefrom, and an oscillatory tray pivotally suspended from the casing at the discharge opening thereof and movable into and out of the path of the sealing wax to cut off the drip from the molds.

17. A machine for molding sealing wax including an endless chain of sectional molds having upper and lower flights and arranged to open automatically to discharge the molded sealing wax from them at the rear end, means located at the front end of the upper flight of the molds for pouring melted sealing wax into the same, and a superimposed sprayer located in rear of the pouring means and above the upper flight and extending from a point adjacent to the pouring means to the rear portion of the conveyer and provided at intervals with jet openings for discharging water upon the molds to partially chill the sealing wax.

18. A machine for molding sealing wax including a wheel, an endless chain of sectional molds divided at the center, the sections being arranged at an angle while passing around the wheel, whereby the molds are automatically opened to discharge the molded sealing wax, and a curved guard arranged to retain the sealing wax within the molds during a portion of their travel around the wheel and having a terminal portion for engaging the sealing wax while the sections are in angular relation, whereby the sealing wax is positively freed from the sections of the mold.

19. A machine for molding sealing wax including an endless chain of molds having upper and lower horizontal flights, means for delivering the sealing wax to the molds at the front end of the upper flight, means for partially chilling the sealing wax while the same is in the molds, an endless conveyer located in a plane below the upper flight of the endless chain of molds, a device arranged in the path of the material for positively freeing the sealing wax from the molds for delivering the former onto the conveyer, and means for thoroughly chilling and setting the sealing wax while on the conveyer.

20. A machine for molding sealing wax including an endless chain of molds having upper and lower horizontal flights, means for delivering sealing wax to the molds at the front end of the upper flight, means for partially chilling the sealing wax while the same is in the molds, an endless conveyer located in a plane below the endless chain of molds, exteriorly arranged means for positively removing the sealing wax from the molds, an inclined chute extending from the molds to the conveyer, and a sprayer located above the conveyer for thoroughly chilling and setting the sealing wax.

21. A machine for molding sealing wax including an endless series of molds having upper and lower horizontal flights, means for delivering the sealing wax to the molds at the front ends of the upper flight, an endless conveyer located in a plane below the molds, an inclined chute arranged to deliver the sealing wax from the molds to the conveyer, exteriorly arranged means located above the chute for positively dislodging the sealing wax from the molds, and horizontal sprayers located above the molds and the conveyer, respectively.

22. A machine for molding sealing wax including an endless chain of molds arranged horizontally, relatively large end rolls receiving the endless chain of molds, a tank located between the upper and lower flights of the said endless chain of molds, intermediate rolls mounted on the tank and supporting the upper flight of the endless chain of molds, and a sprayer arranged above the molds.

23. A machine for molding sealing wax including an endless chain of molds having upper and lower horizontal flights, a horizontal endless conveyer arranged in a plane below the molds, a tank interposed between the flights of the endless conveyer, end rolls located beyond the tank and receiving the endless conveyer, intermediate rolls mounted in the tank and supporting the upper flight of the endless conveyer, means for delivering the sealing wax from the molds to the endless conveyer, and a longitudinal sprayer located above the endless conveyer.

24. A machine for molding sealing wax including an endless chain of sectional molds having longitudinal upper and lower flights and arranged to open automatically at the rear end for discharging the molded sealing wax from them, said molds having permanently open tops, means located at the front end of the upper flight of the molds for pouring the sealing wax into the same, means arranged above the upper flight of molds and extending longitudinally thereof from a point near the pouring means to the rear portions of the upper flight for chilling the sealing wax in the molds before the same is discharged therefrom, and a tank arranged beneath and receiving the lower flight of molds for wetting and chilling the same.

In testimony, that I claim the foregoing as my own, I have hereto affixed my signature in the presence of two witnesses.

GEORGE DAVID CULLUM CODDINGTON.

Witnesses:
 VERN SELBY,
 JOHN H. KEMP.